UNITED STATES PATENT OFFICE.

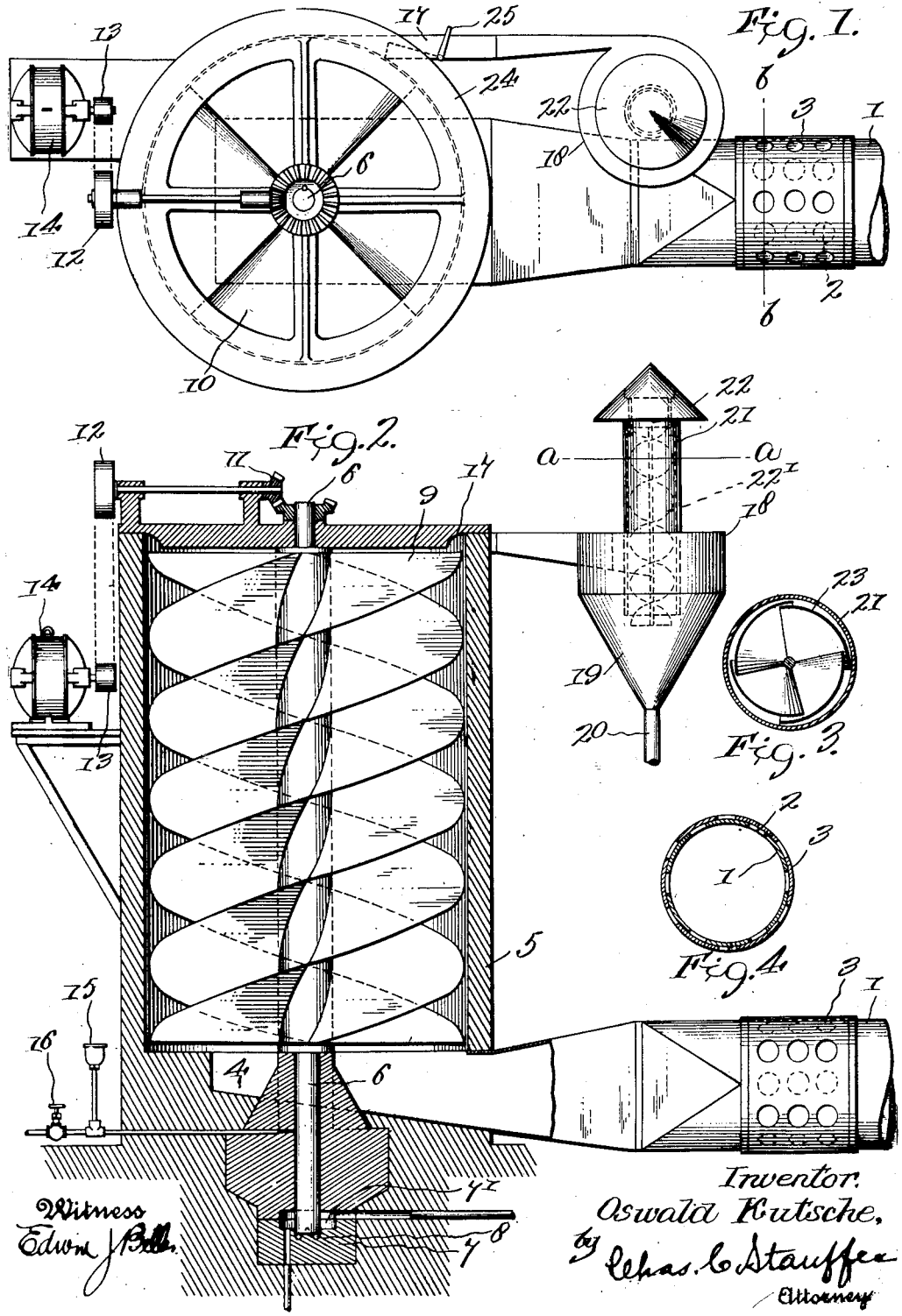

OSWALD KUTSCHE, OF PITTSBURGH, PENNSYLVANIA.

AIR-CLEANER AND PROCESS OF CLEANING AIR.

1,274,058.

Specification of Letters Patent.   Patented July 30, 1918.

Application filed March 1, 1917. Serial No. 151,752.

*To all whom it may concern:*

Be it known that I, OSWALD KUTSCHE, a citizen of the United States, residing at Pittsburgh, county of Allegheny, State of Pennsylvania, have invented certain new and useful Improvements in Air-Cleaners and Processes of Cleaning Air; and I do hereby declare the following to be a full, clear, and exact description of the invention, such as will enable others skilled in the art to which it appertains to make and use the same.

My invention relates to an improvement in devices intended for cleaning air, that is, for removing from air mechanical impurities, such as dust in air coming from a cement crusher, coal crusher, flour mill, pigment grinder, or other grinding mills where refractory substances are subjected to a crushing action with the incidental production of dust.

My invention is also applicable to smoke and other products of combustion coming from a furnace of any kind for the removal of particles of unburnt carbon, ash, etc. It is also useful in connection with ore crushers, and in fact is useful wherever fine dust is produced.

It often happens in such situations that the fine dust thus produced is of very high grade material, and its loss on this account is particularly annoying, and its effect upon the surrounding neighborhood is intensified by the fineness of the material carried out. In other words, the finer the dust the more desirable it is to save it, and the more injurious it is if it escapes, because very fine dust is carried much farther and is apt to spread injury through a wider zone than the coarser grade of dust. This makes my invention particularly applicable for use in connection with cement kilns. It is also very useful in connection with coal crushers where the coal is crushed to a fine powder for injection by steam or air blast into a furnace, there to be burned.

My invention is not limited only to dust or impurities in a solid state. It may be used in the separation of liquid granules or mist from air under certain conditions.

My invention relates to an apparatus for effecting removal from air of impurities of the kind indicated above, and also the process by which this is effected.

Dry dust, or dust in absolutely dry air, is much more readily diffused than dust in air containing even a very small percentage of moisture. Similarly, too, the temperature of the air has a good deal to do with this, the higher the temperature the wider and more complete the diffusion. A third condition maintains in some relations which is due to the fact that particles of the powder in the material crushed, striking against either the walls of the conduit or some other part of the apparatus, become all charged with static electricity of the same sign. This tends to add to the dissemination.

I have found that if I conduct away dust laden air from any producing origin, say, from a coal crushing device or from a furnace, and inject into the column of air thus taken away, a certain proportion of cooler outside air, precipitation of the dust and its separation is much accelerated. I attribute this effect to several causes. One is the fact that the outside air being usually cooler, is charged with a higher percentage of sensible moisture than the dust laden air coming through a conduit. This moisture coming in contact with the particles in the column, imparts to them a tendency to coalesce or agglomerate; besides it discharges the static charge, or helps to discharge or take away the static charge for any of the particles.

Finally, in case the dust column is coming from a furnace, the incoming air chills the products of combustion, and particularly the steam produced by such combustion as in the burning of hydrocarbon, into sensible moisture, to some extent, and this helps the separation and agglomeration.

After the admission of external air, which I prefer to effect on the exterior of the column, the column is carried through a rotating and propelling tower, where the particles of dust are thrown centrifugally to the outer shell of air within the column. The belt or layer of cold air admitted at the zone indicated, forms a layer of clean cold air which separates the moving column of dust laden air somewhat from the walls of the conduit whereby the formation of charged particles of material is to some extent avoided. This shell or layer of air is removed or skimmed off as it were, while the center air column escapes free, and said layer is carried to a dust separating device where the dust is separated in a manner which will be explained later.

In the drawings:

Figure 1 is a top view of my apparatus.

Fig. 2 is a central vertical section.

Fig. 3 is a section on the line a—a; and

Fig. 4 is a section on the line b—b showing details of my apparatus.

In the drawings, 1 represents a conduit through which I lead a column of air from any source where it has become charged with dust, as, for instance, from a furnace burning soft coal, or a coal grinding mill. I provide, at one place in this conduit 1, a series of openings 2, here shown as a series extending around the conduit completely, and I surround the conduit at this point with a sleeve 3 perforated with openings adapted to register with the openings 2, in whole or in part. The openings need not extend all the way around the conduit. Air entering through these openings being outside air, has a certain percentage of moisture present. This percentage may be increased, if desired, in any suitable way.

The conduit discharges at 4 at the bottom of a tower 5, arranged at an angle to the conduit, whereby the direction of a passing stream or column becomes changed. The mixing of the outside belt or layer of clean air with the column of dust laden air is facilitated too, by the change at this point of the shape of the conduit. In this tower is mounted a shaft 6 provided with a number of blades extending to the inner wall of the tower and adapted to propel forward and upward the column of air, and at the same time to throw the air outward centrifugally and also all mechanical impurities carried thereby. The lower end of this shaft 6 is stepped in a block 7 and provided with ball bearings 8, if need be. I provide a number of these vanes 9, here shown as four, mounted on the same shaft and all given the same pitch, so that the mechanical nature of the fan and propeller is that of a quadruple threaded screw. By this arrangement I find that I can give great propulsive movement to the air, and at the same time effect the throwing to the outside of all dust and other mechanical impurities with great success.

A finer thread, that is a flatter pitch, would probably cause more friction and wear, while a single thread of the coarse pitch, which I have indicated here, will permit some of the air to escape at the center, as at 10, carrying dust with it.

The rotation of the shaft with its threads or vanes is effected through suitable gearing 11, 12, 13, connected with a motor 14. I also provide an oiling device 15 whereby lubricant is fed to the lower part of the bar for shaft 6, and I may provide a valve 16 for removing the lubricant, if I desire. I may provide a water circulating means 7' for cooling and lubricating the lower end of the shaft.

At the upper end of my tower 5 I provide a rim conduit 17 into which air and dust enter, partly being drawn there by the centrifugal force of the vanes and partly carried there by the rotative movement of the column of air. This conduit 17 is, as shown, arranged to discharge tangentially to the tower, and its other end is arranged to enter a dust collector 18 on a tangent. The dust thus carried from the tower 5 to the dust collector 18 is given a swirl as it enters the latter by means of the tangent on the side and the cone shaped bottom 19 of the collector, and settles down around the sides of the collector and may be taken off through a pipe 20.

Air freed from dust escapes through the second tower 21 and comes out at 22. This second tower is provided on its interior with a screw 22' of the shape indicated, which may be fixed in position, thus offering a tortuous or spiral channel through which the escaping air goes, and where it acquires a gyratory and centrifugal movement. On the outside of this I arrange certain collecting vanes 23, see Fig. 3, which skim off or take from the rising column of air the outside layer in which will be found any dust that might be carried into the tower. The screw 22' may be loose.

In the conduit 17 I provide a valve 24 provided with a handle 25, by adjusting which handle the quantity of thickness of the layer of air entering the conduit 17 may be determined. It will thus be noted that while the column or stream of air is passing it is subjected to chilling admixture, to centrifugal action, to skimming, to passage through a conduit, to swirling and settling, and to a final skimming separation. All of these acts have their value in the ultimate purification effected, and are all coöperative to the same effect, viz. the complete removal of dust particles — some of the particles being amenable to treatment by one or more of said acts. It is particularly to be noted that the comparatively gentle action in the container 19, is effective after the more vigorous action preceding it, in removing unagglomerated or non-agglomerable motes floating in the current.

It is obvious that equivalents may be substituted in some of the relations here indicated, and I desire my claims to embrace all such equivalents.

It will be seen that I have provided a simple and efficient device into which air pulled in by the suction of the blades 9 surrounds the column of advancing air laden with dust, and is pulled into it and mixed with it in the flatter part of the conduit and by the blades 9 in the tower 5. This incoming air being cooler than the dust laden air has, as indicated above, an agglomerating effect upon the particles of impurities carried by the column, and this agglomerating effect is, though not always understood, partly attributable to the moisture it carries in from the outside, partly attributable to its condensing effect upon the moisture which may be present in the column, as dry steam, and partly due to negativing the dispersing effect attributable to the fact that particles throughout are uniformly charged with static electricity of the same sign. Furthermore, the mere chilling itself has a tendency to permit the particles to coalesce or agglomerate.

Having thus described my invention, what I claim and desire to secure by Letters Patent of the United States, is:

1. The process of cleaning and purifying air which consists in passing warm dust laden air in a continuous column, introducing clean cold air directly into the passing column around its periphery only, whereby the said column is surrounded at its introducing zone by a belt of clean cold air, and thus separated somewhat from the walls of the conduit whereby the formation of charged particles is avoided and coalescence induced, changing the direction of said stream, then imparting to said stream a whirling action, whereby particles of agglomerated coalesced dust are thrown out, continuing said column in a tangential direction in a plane parallel to its first direction, settling, and skimming.

2. The process of cleaning and purifying air which consists in passing warm dust laden air in a continuous column, introducing clean cold air directly into the passing column around its periphery only, whereby the said column is surrounded at its introducing zone by a belt of clean cold air, and thus separated somewhat from the walls of the conduit whereby the formation of charged particles is avoided and coalescence induced, changing the direction of said stream, then imparting to said stream a whirling action in several steeply pitched, substantially parallel spiral columns, whereby particles of agglomerated coalesced dust are thrown out, continuing said column in a tangential direction in a plane parallel to its first direction, settling, and skimming.

3. In a device for removing dust from air, a cylinder, an admission conduit arranged to discharge tangentially into the upper part of the cylinder, a settling and collecting cone connected to the lower part of said cylinder, a discharge cylindrical conduit for cleaner air, leading from the upper part of said cone through said cylinder axially of said cylinder, means in the upper part of said conduit for giving a spiral swirl to the ascending column of air, and vertically arranged skimming devices in the walls of said conduit for skimming off or removing any final air carried dust particles.

In testimony whereof, I affix my signature.

OSWALD KUTSCHE.